United States Patent
Holmberg et al.

(10) Patent No.: US 12,163,752 B2
(45) Date of Patent: *Dec. 10, 2024

(54) ARRANGEMENT FOR RELEASABLY SECURING A WEAPON

(71) Applicant: BAE Systems Hägglunds Aktiebolag, Örnsköldsvik (SE)

(72) Inventors: Lars Holmberg, Nyland (SE); Bengt Wikman, Örnsköldsvik (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/337,839

(22) Filed: Jun. 20, 2023

(65) Prior Publication Data
US 2024/0191961 A1  Jun. 13, 2024

Related U.S. Application Data

(63) Continuation of application No. 17/432,465, filed as application No. PCT/SE2020/050148 on Feb. 12, 2020, now Pat. No. 11,719,502.

(30) Foreign Application Priority Data

Feb. 22, 2019 (SE) .................................. 1950234-3

(51) Int. Cl.
*F41A 23/18* (2006.01)
*B60R 7/14* (2006.01)

(52) U.S. Cl.
CPC .............. *F41A 23/18* (2013.01); *B60R 7/14* (2013.01)

(58) Field of Classification Search
CPC ......... B60R 7/14; A47B 81/005; F41A 23/18; F41C 33/06
See application file for complete search history.

(56) References Cited

U.S. PATENT DOCUMENTS 1,837,939 A * 12/1931 Zimmerman ............. B60R 7/14
  248/316.5
2,379,060 A *  6/1945 Bacheldor ............. A47L 13/512
  248/113

(Continued)

FOREIGN PATENT DOCUMENTS

CN       109090862 A   12/2018
KR     20170142002 A   12/2017

OTHER PUBLICATIONS

International Search Report and Written Opinion for International Application No. PCT/SE2020/050148 mailed on Mar. 20, 2017, 17 pages.

(Continued)

*Primary Examiner* — Joshua E Freeman
(74) *Attorney, Agent, or Firm* — Morrison & Foerster LLP

(57) ABSTRACT

The present invention relates to arrangement for releasably securing a weapon. Said arrangement comprises a fixed support member and a locking member spring loadedly and movably connected to the fixed support member such that when the weapon is pressed towards the locking member, the locking member is moved relative to the support member from a closed position to an open position so that said weapon is allowed to be introduced through an opening of the locking member into a holding position of the locking member, and such that, when the weapon is positioned in said holding position, the spring loaded locking member is returned to said closed position by means of a spring force. Said arrangement may further comprise an actuator arranged for moving the locking member against a spring force into said open position for allowing said weapon to be released. The present invention also relates a vehicle.

14 Claims, 5 Drawing Sheets

(56) References Cited

U.S. PATENT DOCUMENTS

| | | | | |
|---|---|---|---|---|
| 2,632,619 | A * | 3/1953 | Wilson | B60R 7/14 224/570 |
| 2,919,058 | A * | 12/1959 | Thompson | B60R 7/14 224/570 |
| 3,701,436 | A * | 10/1972 | Adams | A63C 11/028 224/406 |
| 3,706,403 | A * | 12/1972 | Sikes | B60R 7/14 224/571 |
| 3,746,177 | A * | 7/1973 | Vilotti | F41A 23/18 211/64 |
| 4,690,440 | A * | 9/1987 | Rogers | E05B 65/0007 292/228 |
| 4,986,427 | A * | 1/1991 | Law | A47B 81/005 211/117 |
| 5,344,032 | A * | 9/1994 | Ramsdell | A47B 81/005 211/64 |
| 5,979,846 | A * | 11/1999 | Fluhr | B60R 7/14 248/552 |
| 6,742,687 | B2 * | 6/2004 | Morford | B60R 7/14 224/311 |
| 7,503,459 | B2 * | 3/2009 | Grayson | A47B 81/005 211/70.8 |
| 8,403,278 | B1 * | 3/2013 | Kasbohm | F41A 23/18 42/99 |
| 8,616,505 | B2 * | 12/2013 | Gates | F16M 11/041 248/62 |
| 8,678,206 | B2 * | 3/2014 | Kubiniec | F41A 23/18 211/64 |
| D705,045 | S * | 5/2014 | Lænner | D8/380 |
| 11,092,401 | B2 * | 8/2021 | Kubiniec | A47F 7/0028 |
| 2008/0087785 | A1 * | 4/2008 | Roche | A47B 81/005 248/309.4 |
| 2017/0030114 | A1 * | 2/2017 | Fisher | E05B 73/00 |
| 2017/0276446 | A1 | 9/2017 | Irwin | |
| 2017/0336162 | A1 * | 11/2017 | Plourde | F41A 17/06 |
| 2018/0094892 | A1 * | 4/2018 | Bowe, Jr. | F41A 23/18 |
| 2020/0378712 | A1 * | 12/2020 | Kubiniec | F41A 23/18 |

OTHER PUBLICATIONS

Swedish Search Report for Swedish Application No. 1950234-3 mailed on Sep. 27, 2019, 10 pages.

Extended European Search Report and Written Opinion received for European Patent Application No. 20759264.3 mailed on Nov. 14, 2022, 8 pages.

Holmberg et al. U.S. Office Action mailed Jan. 6, 2023 directed to U.S. Appl. No. 17/432,465; 8 pages.

* cited by examiner

ARRANGEMENT FOR RELEASABLY SECURING A WEAPON

CROSS REFERENCE TO RELATED APPLICATIONS

This application is a continuation of U.S. application Ser. No. 17/432,465 filed on Aug. 19, 2021, which is a U.S. national stage application under 35 U.S.C. § 371 of International Application No. PCT/SE2020/050148, filed internationally on Feb. 12, 2020, which claims priority to SE 1950234-3, filed on Feb. 22, 2019, the entire contents of each of which are incorporated herein by reference.

FIELD OF THE DISCLOSURE

The present invention relates to an arrangement for releasably securing a weapon. The present invention also relates to a vehicle comprising an arrangement for releasably securing a weapon.

BACKGROUND OF THE DISCLOSURE

There are many different solutions of arrangements for releasably securing weapons such as rifles in vehicles, e.g. military vehicles. A problem with certain known solutions is that they do not withstand high impact loads in multiple directions risking that the weapon releases and hits a passenger. Such impact loads may be due to a landmine attack or a side blast.

Arrangements for releasably securing weapons should further be easy to handle for the operator, which is not always the case with known solutions.

There is thus a need for providing an improved arrangement for releasably securing a weapon.

OBJECTS OF THE INVENTION

An object of the present invention is to provide an arrangement for releasably securing a weapon, which withstands impact loads in multiple directions.

Another object the present invention is to provide an arrangement for releasably securing a weapon, which is easy to handle for the operator.

A further object of the present invention is to provide a vehicle comprising such an arrangement for releasably securing a weapon.

SUMMARY OF THE DISCLOSURE

These and other objects, apparent from the following description, are achieved by an arrangement and a vehicle, as set out in the appended independent claims. Preferred embodiments of the arrangement are defined in appended dependent claims.

According to the invention the objects are achieved by an arrangement for releasably securing a weapon. Said arrangement comprises a fixed support member and a locking member spring loadedly and movably connected to the fixed support member such that when the weapon is pressed towards the locking member, the locking member is moved relative to the support member from a closed position to an open position so that said weapon is allowed to be introduced through an opening of the locking member into a holding position of the locking member, and such that, when the weapon is positioned in said holding position, the spring loaded locking member is returned to said closed position by means of a spring force.

Hereby an arrangement for releasably securing a weapon may be provided, which facilitates securing the weapon so that it withstands impact loads in different directions. For example a weapon may hereby be secured, in a vehicle having such an arrangement, in the holding position by introducing barrel of the weapon any direction such as impact loads caused by the vehicle being subject to a landmine or an Improvised Explosive Device (IED) attack.

According to an embodiment of the arrangement, the locking member is configured to be spring loadedly and movably connected to the fixed support member such that when the weapon is pressed towards the locking member, the locking member including the opening of the locking member is moved relative to the support member from the closed position where the opening is blocked by the support member, to the open position, where the opening of the support member is not blocked by the support member so that said weapon is allowed to be introduced through the opening.

According to an embodiment of the arrangement, the locking member is configured to be spring loadedly and movably connected to the fixed support member such that, when the weapon is positioned in said holding position, the spring loaded locking member including the opening of the locking member is returned to said closed position by means of a spring force so that the opening is blocked by the support member.

Hereby an arrangement for releasably securing a weapon may be provided, which facilitates securing the weapon so that it withstands impact loads in different directions. For example a weapon may hereby be secured, in a vehicle having such an arrangement, in the holding position by introducing barrel of the weapon through the opening so that the weapon is secured even if the vehicle is subjected to impact loads in any direction such as impact loads caused by the vehicle being subject to a landmine or an Improvised Explosive Device (IED) attack.

According to an embodiment, the arrangement further comprises an actuator arranged for moving the locking member against a spring force into said open position for allowing said weapon to be released. Hereby easy handling of the weapon by the operator is facilitated in that the operator may release the weapon from the holding position by means of the actuator by only using one hand.

According to an embodiment of the arrangement said actuator is arranged onto said locking member. By thus arranging the actuator onto said locking member easy handling of the weapon by the operator is facilitated in that the operator may easily access the actuator and thereby release the weapon from the holding position by means of the actuator by only using one hand.

According to an embodiment the arrangement further comprises a spring member connected between said fixed support member and said locking member so as to provide said spring load of the arrangement. By thus providing a spring member efficient locking of the locking member is facilitated and by means of providing a suitable spring force, introduction of the weapon through the opening into the holding position may be easily obtained.

According to an embodiment of the arrangement the locking member is movably connected to the support member such that the movement of the locking member relative to the support member is a restricted rotational movement about a rotational centre. Hereby efficient securing of the weapon when the weapon is arranged in the holding position is obtained in that essentially a rotational impact force around the rotation centre of the locking member would be required in order to possibly affect the locking member in the locked position. Thus, hereby efficient securing of the weapon in the holding position when subjected to impact forces in different directions is obtained.

According to an embodiment of the arrangement, the locking member is configured such that, when the locking member is moved, it is rotated relative to the support member. According to an embodiment of the arrangement, the locking member is configured such that, when the locking member is moved, it is configured to rotate within a portion of the fixed support member. According to an embodiment of the arrangement, the locking member is configured such that, when the locking member is moved, it is configured to rotate within opening of the fixed support member. According to an embodiment of the arrangement, the locking member is configured such that, when the locking member is moved, it is configured to rotate about the rotational centre of the locking member within opening of the fixed support member. Hereby rotation between the closed position and the open position may be provided in a compact and easily controlled way.

According to an embodiment of the arrangement, the actuator is arranged to rotate the locking member relative to the support member. According to an embodiment of the arrangement, the actuator is arranged to rotate the locking member within a portion of the fixed support member. According to an embodiment of the arrangement, the actuator is arranged to rotate the locking member within an opening of the fixed support member.

According to an embodiment of the arrangement the locking member is configured such that when the weapon is in the holding position, the centre of the weapon is offset relative to the rotational centre of the locking member. Hereby even more efficient securing of the weapon when the weapon is arranged in the holding position is obtained due to the offset of the rotational centre of the locking member and the centre of the weapon, i.e. the centre of the barrel of the weapon. Thus, hereby efficient securing of the weapon in the holding position when subjected to impact forces in different directions is obtained.

According to an embodiment the arrangement further comprises a guiding arrangement comprising a guide member and an arc shaped groove, wherein the guide member is configured to run along said arc shaped groove for controlling the movement of the locking member in a restricted rotational movement. Hereby control of the movement of the spring loaded locking member between the closed position and the open position may be performed in an easy and efficient way. By thus providing a guiding arrangement with an arc shaped groove efficient securing of the weapon when the weapon is arranged in the holding position in that essentially a rotational impact fore around the rotation centre of the arc shaped groove would be required in order to possibly affect the locking member in the locked position. Thus, hereby efficient securing of the weapon in the holding position when subjected to impact forces in different directions is obtained.

According to an embodiment of the arrangement said arc shaped groove is arranged in said support member and wherein the guide member is attached to said locking member. Hereby control of the movement of the spring loaded locking member between the closed position and the open position may be performed in an easy and efficient way.

According to an embodiment of the arrangement the locking member has a horseshoe shaped portion providing said opening. Hereby the barrel of a weapon may be easily and efficiently introduced through the opening into the holding position of the locking member.

According to an embodiment of the arrangement the opening comprises an angled portion so as to allow the locking member to receive weapons of different sizes. Hereby an efficient way of facilitating releasably securing weapons of different size, e.g. weapons with barrels of different sizes.

According to an embodiment of the arrangement said support member has a cover portion configured to cover the opening of the locking member in the closed position. Hereby the weapon is efficiently secured in the holding position with the locking member is in the closed position.

According to an embodiment of the arrangement said support member has a claw shaped end portion having a first arm portion constituting said cover portion and second arm portion, said arm portions providing an opening there between for allowing the weapon in the open position of the locking member in which the opening of the locking member is configured to essentially coincide with the opening of the support member.

According to an embodiment of the arrangement the cover portion has an angled shape so as to allow the arrangement to receive weapons of different sizes. Hereby an efficient way of facilitating releasably securing weapons of different size, e.g. weapons with barrels of different sizes.

According to an embodiment of the arrangement said object has a cylindrical portion to be received by said arrangement.

According to an embodiment of the arrangement said object is a weapon having a barrel to be received by said arrangement.

According to the invention the objects are achieved by a vehicle comprising an arrangement as set out herein.

BRIEF DESCRIPTION OF THE FIGURES

For a better understanding of the present invention reference is made to the following detailed description when read in conjunction with the accompanying drawings, wherein like reference characters refer to like parts throughout the several views, and in which.

DETAILED DESCRIPTION OF THE DISCLOSURE

Figure 1:
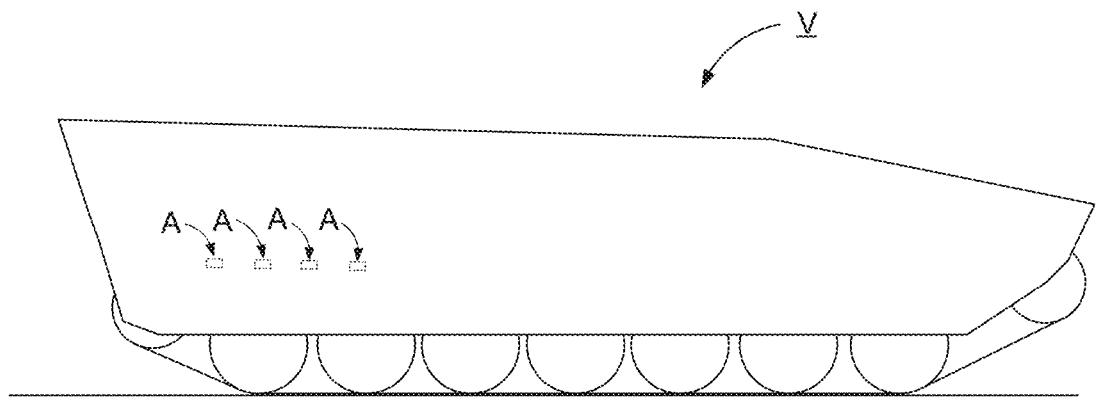
FIG. 1 schematically illustrates a vehicle according to an embodiment of the present disclosure.

FIG. 1 schematically illustrates a vehicle V according to an embodiment of the present disclosure.

The vehicle V is according to the disclosure in FIG. 1 a tracked vehicle. The vehicle V is according to the disclosure in FIG. 1 a military vehicle.

The vehicle V comprises an arrangement A for releasably securing a weapon having a barrel to be received by the arrangement A. The vehicle V may comprise one or more such arrangements A. The arrangement A for releasably securing a weapon is configured to be arranged on the inside of the vehicle V, according to an embodiment on internal walls of the vehicle V. For a weapon having a barrel, e.g. a rifle, the arrangement A may be arranged at a certain height for receiving the barrel, wherein a receiving device, e.g. a bowl or the like, may be provided at the bottom for receiving the holding portion of the weapon.

The vehicle according to the present disclosure may be any suitable vehicle for such an arrangement. The vehicle according to the present disclosure may be a wheeled vehicle. The vehicle according to the present disclosure may be an aeroplane. The vehicle according to the present disclosure may be a helicopter. The vehicle according to the present disclosure may be a boat. The vehicle according to the present disclosure may be a train.

Figure 2:
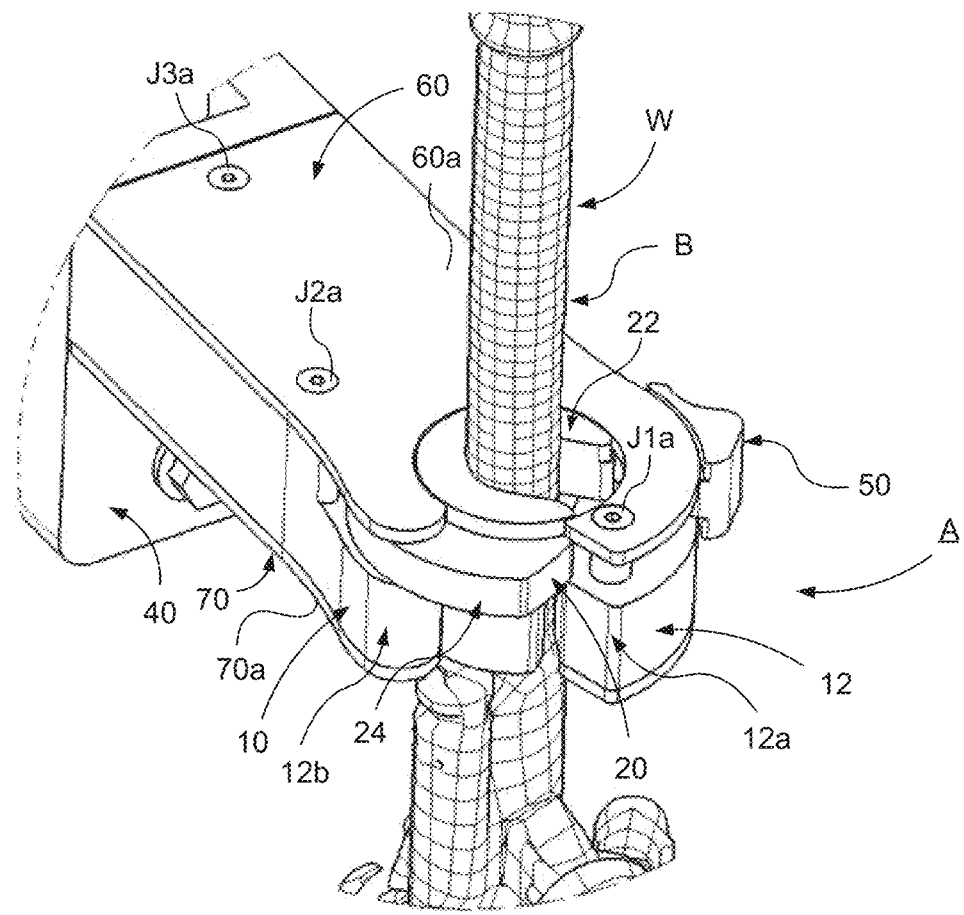
FIG. 2 schematically illustrates a perspective view of an arrangement for releasably securing a weapon according to an embodiment of the present disclosure.
Figure 3A:
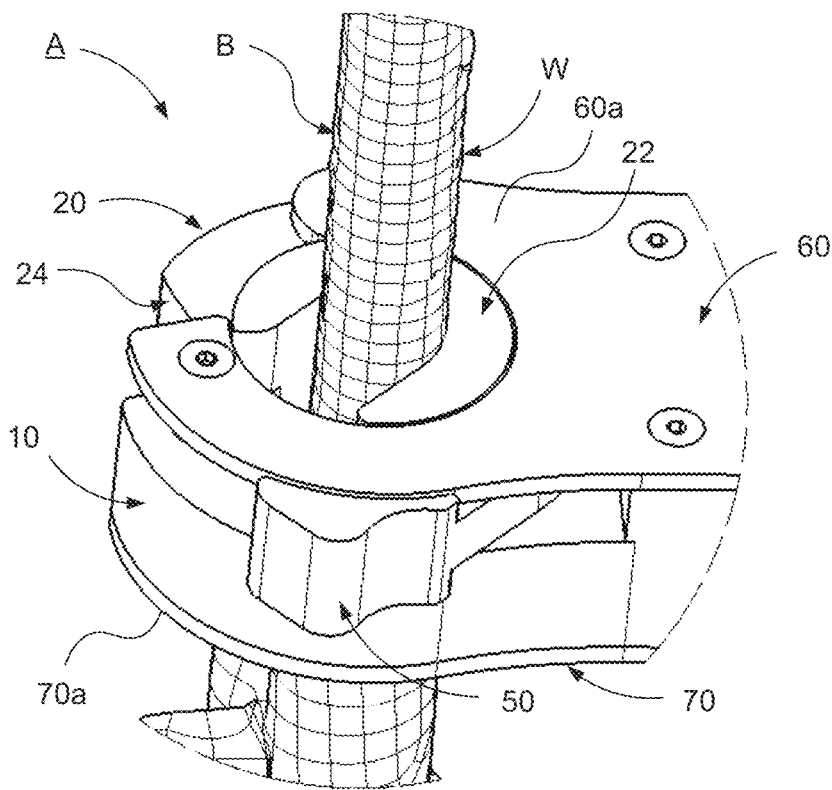
FIG. 3a schematically illustrates a perspective view of the arrangement in FIG. 2 according to an embodiment of the present disclosure.
Figure 3B:
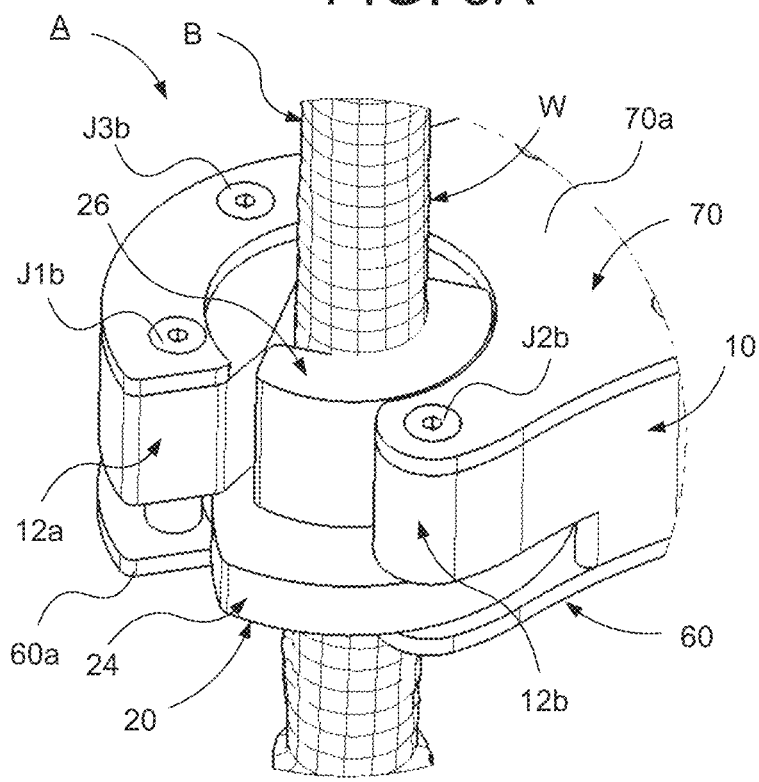
FIG. 3b schematically illustrates a perspective view of the arrangement in FIG. 2 viewed from the underside according to an embodiment of the present disclosure.
Figure 4:
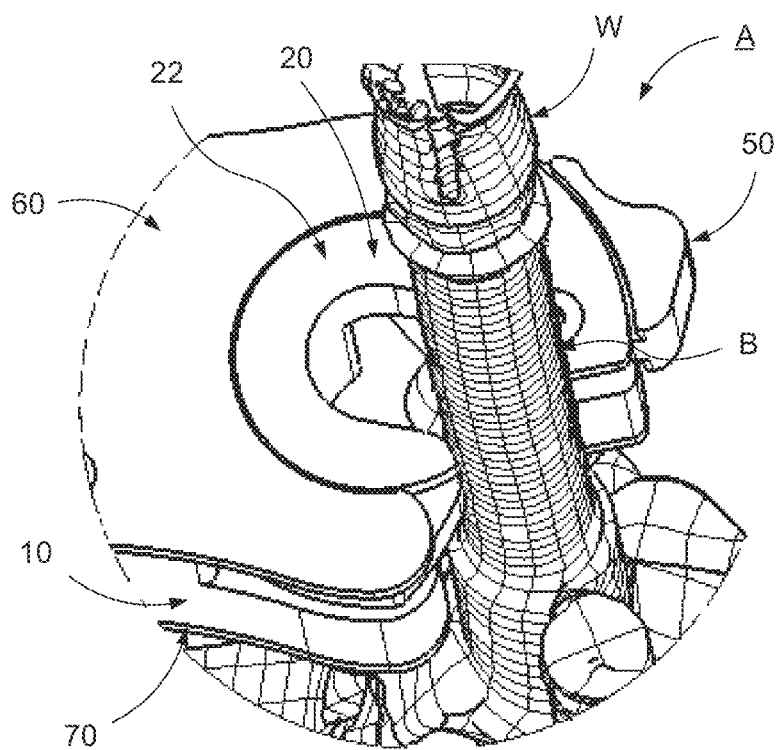
FIG. 4 schematically illustrates a perspective view of the arrangement in FIG. 2 according to an embodiment of the present disclosure.
Figure 5:
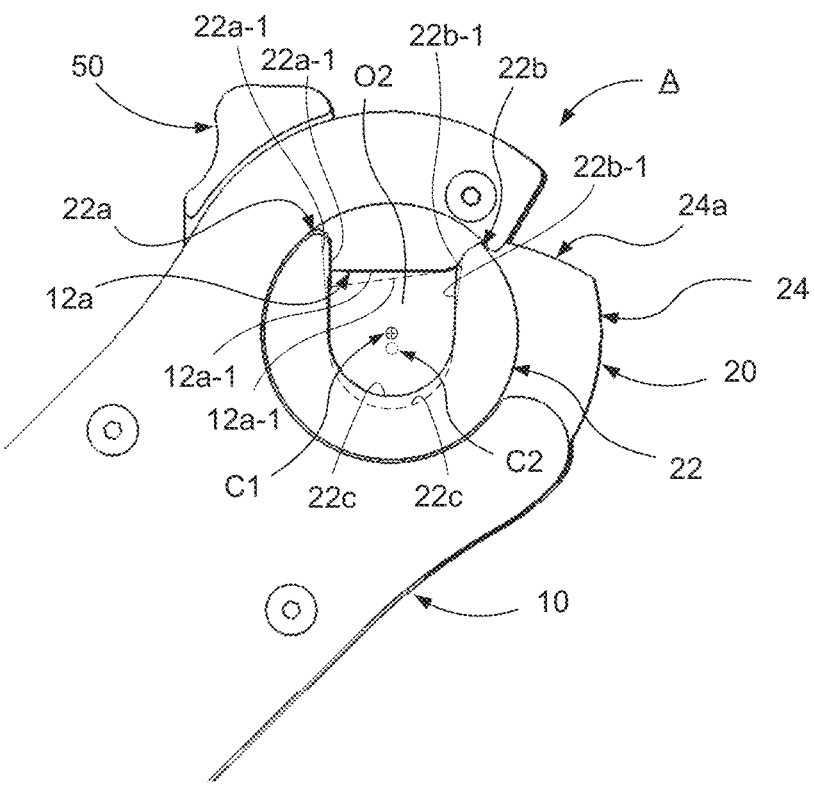
FIG. 5 schematically illustrates a plan view of the arrangement in FIG. 2 according to an embodiment of the present disclosure.
Figure 6:
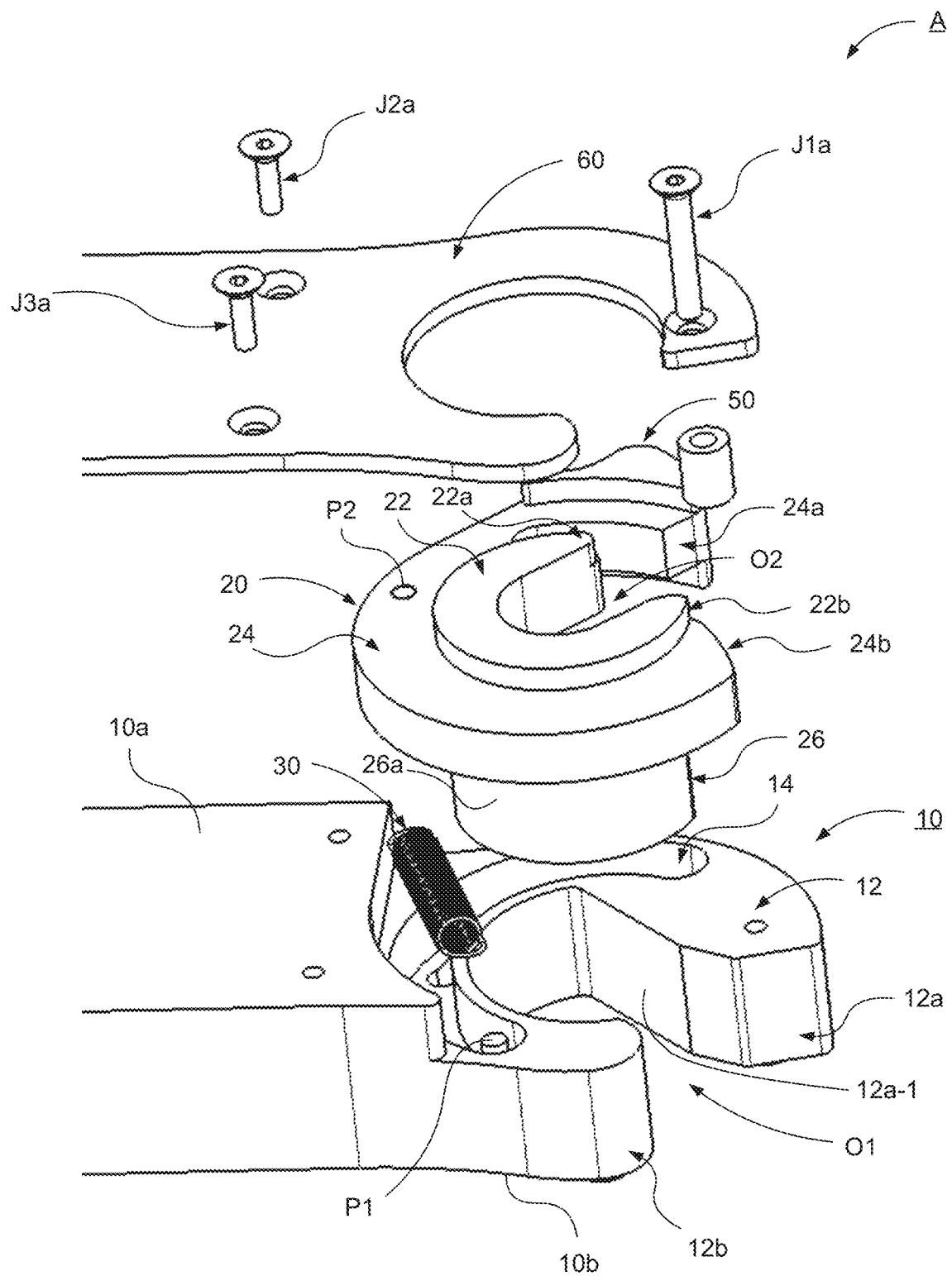
FIG. 6 schematically illustrates an exploded perspective view of the arrangement in FIG. 2 according to an embodiment of the present disclosure.
Figure 7:
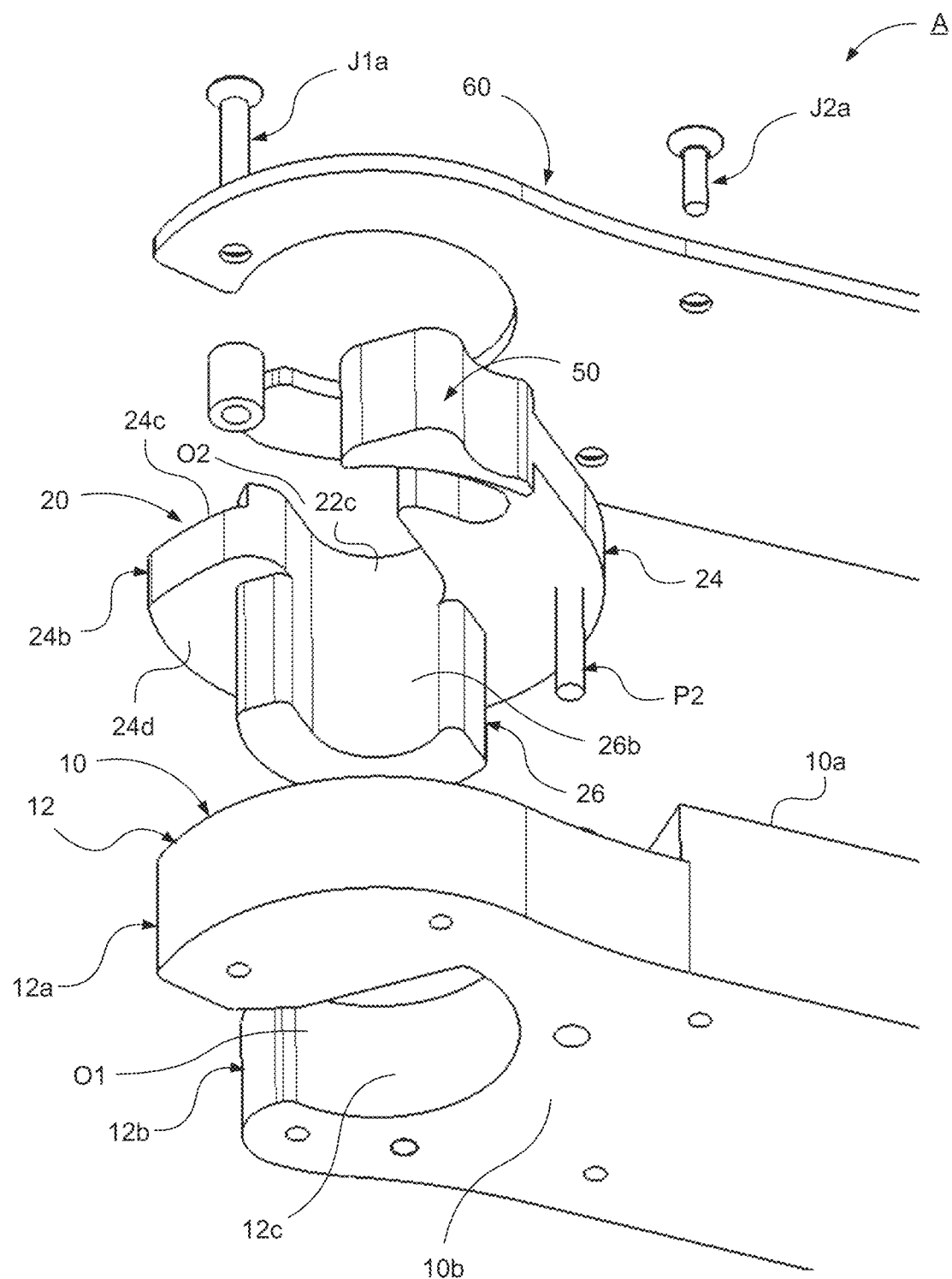
FIG. 7 schematically illustrates an exploded perspective view of the arrangement in FIG. 2 according to an embodiment of the present disclosure.

FIGS. 2, 3A and 4 schematically illustrates different perspective views from above of an arrangement A for releasably securing a weapon W according to an embodiment of the present disclosure; FIG. 5 a plan view of the arrangement A; and FIG. 3B schematically illustrates a perspective view of the arrangement A viewed from the underside. FIG. 6 schematically illustrates an exploded perspective view of the arrangement viewed from above and FIG. 7 an exploded perspective view of the arrangement A viewed from underneath.

The arrangement according to the present disclosure may releasably secure any suitable object, e.g. an object having a cylindrical portion to be received by said arrangement.

According to the embodiment of the arrangement A illustrated in FIGS. 2, 3A, 3B and FIG. 4 said weapon W is a weapon having a barrel B to be received by said arrangement A.

Said arrangement A comprises a fixed support member 10. Said arrangement A further comprises a locking member 20.

The locking member 20 is configured to be spring loadedly and movably connected to the fixed support member 10 such that when the weapon W is pressed towards the locking member 20, the locking member 20 is moved relative to the support member 10 from a closed position to an open position, see FIG. 4, so that said weapon W is allowed to be introduced through an opening O2 of the locking member 20 into a holding position of the locking member 20.

The closed position refers to a position where said opening O2 of the locking member is closed. The locking member 20 is hereby configured to be spring loadedly and movably connected to the fixed support member 10 such that when the weapon W is pressed towards the locking member 20, the locking member 20 including the opening O2 of the locking member 20 is moved relative to the support member 10 from the closed position where the opening is blocked by the support member 10, to the open position, where the opening O2 of the support member 20 is not blocked by the support member 10 so that said weapon is allowed to be introduced through the opening O2. The opening O2 of the support member 20 may, in the open position, be configured to essentially coincide with an opening O1 of the support member 10, see e.g. FIG. 6, for allowing introduction of said weapon through the opening O2.

The locking member 20 is further configured to be spring loadedly and movably connected to the fixed support member 10 such that, when the weapon W is positioned in said holding position, the spring loaded locking member 20 is returned to said closed position by means of a spring force. FIG. 2 and FIGS. 3A-B illustrate the weapon W, i.e. the barrel B of the weapon W, in positioned in the holding position with the spring loaded locking member 20 returned to the closed position. The locking member 20 is configured to be spring loadedly and movably connected to the fixed support member 10 such that, when the weapon W is positioned in said holding position, the spring loaded locking member 20 including the opening of the locking member 20 is returned to said closed position by means of a spring force so that the opening O2 is blocked by the support member. The opening O2 of the support member 20 is configured to be essentially blocked by the support member 10 in the holding position so as to prevent release of said weapon being in the holding position.

The closed position, when referring to the spring loaded locking member 20 being returned to the closed position and holding the weapon W, may essentially correspond to the same closed position as when there is no weapon being positioned in the holding position, i.e. prior to any pressure against the locking member 20.

The locking member 20 is configured to provide locking of the weapon in the holding position closed position provides locking of the. When the weapon is pressed towards the locking member when being in the holding position, the restricted rotational movement prevents the locking member from moving to the open position.

The locking member 20 is configured to be spring loadedly and movably connected to the fixed support member 10 such that when the weapon W is pressed towards the locking member 20, prior to being introduced into the opening O2 and into the holding position and thus being pressed from the outside of the locking member 20, the locking member 20 is configured to be moved relative to the support member 10 from a closed position to an open position. The locking member 20 is configured to be spring loadedly and movably connected to the fixed support member 10 such that when the weapon has been introduced into the opening O2 and into the holding position, and being pressed from the inside towards the outside of the locking member 20, the locking member 20 and the support member 10 are configured and arranged such that movement of the locking member 20, from the locked position, relative to the support member 10 is essentially prevented.

According to an aspect of the present disclosure the locking member 20 is movably connected to the support member 10 such that the movement of the locking member 20 relative to the support member 10 is a restricted rotational movement about a rotational centre C1 of the locking member 20, see FIG. 5. The rotational centre C1 may essentially correspond to the holding position of the weapon. Thus, in the holding position of the weapon W, the locking member 20 is, together with a cover portion 12a of the support member 10, configured to essentially surround the weapon W, see e.g. FIGS. 2 and 5. In the holding position of the weapon W, the opening O2 of the locking member 20 is configured to face the cover portion 12a of the support member 10.

The locking member 20 is configured to be movable about the weapon W in the holding position. The locking member 20 is configured to be movable about the weapon W in the holding position from a locked position in which the opening O2 of the locking member 20 is facing the cover portion 12a of the support member 10 to an open position in which the opening O2 of the locking member 20 essentially coincides with the opening O1 of the support member 10, allowing removal of the weapon W from the holding position. The locking member 20 is movable by means of an outwardly relative to the holding position accessible actuator 50 connected to/being a portion of the locking member 20. The actuator 50 is described in more detail below.

The locking member 20 may be configured such that, when the locking member 20 is moved, it is rotated relative to the support member 10. The locking member 20 may be configured such that, when the locking member 20 is moved, it is configured to rotate within a portion of the fixed support member 10. The locking member 20 may be configured such that, when the locking member 20 is moved, it is configured to rotate within opening of the fixed support member 10. The locking member 20 may be configured such that, when the locking member 20 is moved, it is configured to rotate about the rotational centre C1 of the locking member 20 within opening of the fixed support member 10.

According to an aspect of the present disclosure the locking member 20 is configured such that when the weapon is in the holding position, the centre C2 of the weapon is offset relative to the rotational centre C1 of the locking member 20, see FIG. 5. This is to further secure the weapon W in the holding position. In FIG. 5 only the centre C2 of the barrel B of the weapon W is shown. The centre C2 is thus here the centre C2 of the barrel having a circular cross section, i.e. the centre C2 of the circular cross section of the barrel B.

According to an embodiment of the present disclosure the arrangement A further comprises a spring member 30, see FIG. 6, configured to be connected between said fixed support member 10 and said locking member 20 so as to provide said spring load of the arrangement A. The spring member 30 may be any suitable spring member for providing said spring load of the arrangement A. The spring member 30 is according to the embodiment illustrated in FIG. 6 a helical spring.

The support member 10 has an upper side 10a and an opposite underside 10b.

The support member 10 is according to an aspect of the present disclosure configured to be attached to or comprise a wall mounting member 40, see FIG. 2, configured to be attached to a wall, e.g. an inner wall of a vehicle. The support member 10 is according to an aspect of the present disclosure configured to project from the wall mounting member 40 as illustrated in FIG. 2. The support member 10 has according to this embodiment an elongated shape.

The support member 10 has according to an aspect of the present disclosure a claw shaped end portion 12. The claw shaped end portion 12 has a first arm portion 12a and a second arm portion 12b. Said arm portions 12a, 12b form an opening O1 there between as shown in FIG. 6. The claw shaped end portion 12 has an inner arced shaped surface portion 12c, see FIG. 7.

According to an aspect of the present disclosure the support member 10 comprises an arc shaped groove 14 arranged in said support member 10, see FIG. 6. The arc shaped groove 14 is arranged on the upper side 10a of the support member 10. The arc shaped groove 14 is arranged on the end portion 12 of the support member 10. The arc shaped groove 14 runs in the end portion 12 from a portion of the first arm portion 12a to a portion of the second arm portion 12b. The arc shaped groove 14 thus has a first end in connection to the first arm portion 12a and a second end in connection to the second arm portion 12b.

According to an aspect of the present disclosure a connection member P1 for connecting the spring member 30 to the support member 10 is arranged in the groove 14 in connection to the second end of the groove 14. The connection member P1 is according to an aspect of the present disclosure a pin projecting from the bottom of the groove 14.

According to an aspect of the present disclosure the locking member 20 comprises a horseshoe shaped portion 22 providing said opening O2 through which the weapon W is intended to be introduced. The horseshoe shaped portion 22 has a first end portion 22a and a second end portion 22b. The first end portion 22a has an inner wall portion 22a-1 and the second end portion 22b has an inner wall portion 22b-1, see FIG. 5. The first end portion 22a and second end portion 22b are configured as arm portions. The horseshoe shaped portion 22 has an inner end 22c. The inner end 22c of the horseshoe shaped portion 22 may be provided further away from the outer end of the opening O2 in order to thus move the centre C2 of the barrel of the weapon so as to provide/increase the offset relative to the rotational centre C1 of the locking member 20, see FIG. 5.

According to an aspect of the present disclosure the opening O2 of the horseshoe shaped locking member 20 comprises an angled portion so as to allow the locking member 20 to receive weapons of different sizes. Thus, the opening O2 of horseshoe shaped portion 22 has according to an aspect of the present disclosure an angled portion. The angled opening O2 of the horseshoe shaped portion 22 may thus have a slight tampering from the outer end of the opening O2 towards the inner end 22c of the horseshoe shaped portion 22. Thus, the first inner wall portion 22a-1 and second inner wall portion 22b may have a certain angle relative to each other such that the opening O2 has a slight tampering from the outer end of the opening O2 towards the inner end of the horseshoe shaped portion 22. This is illustrated in FIG. 5 with dotted lines.

According to an aspect of the present disclosure the locking member 20 comprises a move portion 24 for facilitating moving the locking member 20 when a force is applied to the moving member 24.

According to an aspect of the present disclosure the move portion 24 has an arm portion 24a. The arm portion 24a is according to an aspect arranged in connection to the first end portion 22a of the horseshoe shaped portion 22.

According to an aspect of the present disclosure the move portion 24 has a weapon receiving portion 24b against which the weapon W is configured to be pressed in order to move the locking member 20 from the closed position to the open position. The weapon receiving portion 24b is according to an aspect arranged in connection to the second end portion 22b of the horseshoe shaped portion 22.

According to an aspect of the present disclosure a portion of the horseshoe shaped portion 22 is configured to protrude upwardly from the move portion 24.

The move portion 24 is configured to run and project outwardly from the horseshoe shaped portion 22. The move portion 24 has according to an aspect an essentially flat configuration with an upper side 24c and an opposite underside 24d.

According to an aspect of the present disclosure the locking member 20 comprises an arc shaped portion 26 protruding from the underside 24d of the move portion.

The arc shaped portion 26 has an outer arc shaped surface portion 26a corresponding to the inner arc shaped surface portion 12c of the claw shaped end portion 12 of the support member 10. The outer arc shaped portion 26a of the arc shaped portion 26 is shaped so as to fit against and be movable relative to the inner arc shaped surface portion 12c of the claw shaped end portion 12.

The arc shaped portion 26 has an inner arc shaped surface portion 26b opposite to the outer arc shaped surface portion 26a. The inner arc shaped surface portion 26b transfers into the inner surface of the horseshoe shaped portion 22 of the locking member 20.

The arc shaped portion 26 is, together with the horseshoe shaped portion 22 configured to provide said opening O2 of the locking member 20, through which the weapon W is allowed to be introduced and released when the locking member 20 is in the open position.

According to an aspect of the present disclosure the arrangement A comprises a guide member P2 arranged in connection to the locking member 20. The guide member P2 is attached to said locking member 20. The guide member P2 may according to a variant be an integrated part of the locking member 20. The guide member P2 may according to a variant be a separate part configured to be connected to the locking member 20.

The guide member P2 is configured to project downwardly from the underside 24d of the move portion 24 of the locking member 20. The guide member P2 is according to an aspect a pin projecting from the underside 24d.

The guide member P2 is configured to is configured to run along said arc shaped groove 14 for controlling the movement of the locking member 20 in a restricted rotational movement.

The guide member P2 and the arc shaped groove 14 provides a guiding arrangement. Thus, the guiding arrangement comprises the guide member P2 and the arc shaped groove, wherein the guide member P2 is configured to run along said arc shaped groove 14 for controlling the movement of the locking member 20 in a restricted rotational movement.

The spring member 30 is configured to be connected between said fixed support member 10 and said locking member 20 by connecting the spring member 30 to said connection member P1 of the support member 10 and the guide member P2 of the locking member 20 so as to provide said spring load of the arrangement A. The spring member 30 is according to an aspect of the disclosure configured to be arranged in said arc shaped groove 14 of the support member 10.

Said arrangement A further comprises an actuator 50 arranged for moving the locking member 20 against a spring force into said open position for allowing said weapon W to be released. The actuator 50 is configured such that the operator, by applying a force exceeding the force provided by the spring load of the spring member 30, may move the locking member into said open position for allowing said weapon W to be released, which is facilitated with the same hand that operated the actuator 50.

According to an aspect of the present disclosure said actuator 50 is arranged onto said locking member 20. According to an aspect of the present disclosure said actuator 50 is arranged onto said locking member 20 by being an integrated portion of the locking member 20. According to an aspect of the present disclosure said actuator 50 is an integrated portion of the locking member 20. According to an aspect of the present disclosure said actuator 50 is arranged onto said locking member 20 in connection to the arm portion 24a.

According to an aspect of the present disclosure the actuator 50 is arranged to rotate the locking member 20 relative to the support member 10. According to an aspect of the present disclosure the actuator 50 is configured to rotate the locking member within a portion of the fixed support member 10. According to an aspect of the present disclosure the actuator 50 is configured to rotate the locking member 20 within the opening O1 of the fixed support member 10. According to an aspect of the present disclosure the actuator 50 is configured to rotate the locking member about the rotational centre C1 of the locking member 20 within the opening O1 of the fixed support member 10.

According to an aspect of the present disclosure said support member 10 has a cover portion 12a configured to cover the opening O2 of the locking member in the closed position of the locking member 20. The cover portion 12a is constituted by the arm portion 12a. Thus, the locking member 20 is configured to be positioned in the closed position by means of the spring force provided by the spring member 30 so that the opening O2 of the locking member 20 is directed towards the arm portion 12a. The arm portion 12a is thus configured to prevent the weapon W from being released from the holding position in case of an impact against the arrangement A.

The cover portion 12a is, in the closed position of the locking member 20, configured to provide a space which together with the locking member 20, i.e. together with the arc shaped portion 26 of the locking member 20, surrounds the barrel B of the weapon W when the weapon is in the holding position.

According to an aspect of the arrangement A the cover portion 12a, i.e. the arm portion 12a, has an angled shape so as to allow the arrangement to receive weapons of different sizes.

The arm portion 12a has an inner wall portion 12a-1, see FIGS. 5 and 6. The inner wall portion 12a-1 is configured to face the barrel B of the weapon W when the weapon is in the holding position. The inner wall portion 12a-1 may have an angled shape so that weapons of different size, i.e. barrels of different diameter may be introduced and fit within the thus provided space in the locked position of the locking member 20, see FIG. 5. In FIG. 5 the inner wall portion 12a-1 is also illustrated with a dotted line with greater angle. By having such a greater angle, the end 22c of the horseshoe shaped portion 22 may need to be arranged further away from the outer end of the opening O2.

When a weapon W is pressed towards the receiving portion 24b of the move portion 24 of the locking member 20, the locking member 20 is moved relative to the support member 10 from the closed position to an open position so that the opening O2 of the locking member 20 essentially coincides with the opening O1 of the claw shaped end portion 12 of the support member 10 so that said weapon W is allowed to be introduced through the opening O2 of the locking member 20 into the holding position of the locking member 20.

When a weapon W is positioned in said holding position, the spring loaded locking member 20 is returned to said closed position by means of the spring force provided by the spring member 30 so that the arm portion 12a covers the opening O2.

When a weapon W is positioned in said holding position the locking member 20 is moved relative to the support member 10 from the closed position to an open position when the actuator is operated, which may be obtained by one hand, by applying a force exceeding the spring force provided by the spring member 30, so that the opening O2 of the locking member 20 essentially coincides with the opening O1 of the claw shaped end portion 12 of the support member 10 so that said weapon W is allowed to be released from the holding position of the locking member 20.

According to an aspect of the present disclosure said arrangement A comprises an upper cover portion 60 configured to be attached to the upper side 10a of the support member 10. The upper cover portion 60 upper side 60a. The upper cover portion 60 is according to an aspect configured to be attached to the support member 10 by means of joint members J1a, J2a, J3a, see e.g. FIG. 2 and FIG. 6. The joint members J1a, J2a, J3a are according to an aspect provided by screw joint members.

According to an aspect of the present disclosure said arrangement A comprises a lower cover portion 70 configured to be attached to the underside 10b of the support member 10. The lower cover portion 70 has an underside 70a. The lower cover portion 70 is according to an aspect configured to be attached to the support member 10 by means of joint members J1b, J2b, J3b, see e.g. FIG. 3B. The joint members J1b, J2b, J3b are according to an aspect provided by screw joint members.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications suited to the particular use contemplated.

The invention claimed is:

1. An arrangement for releasably securing a weapon, said arrangement comprising a fixed support member and a locking member spring loadedly and movably connected to the fixed support member such that when the weapon is pressed towards the locking member, the locking member is moved relative to the support member from a closed position to an open position so that said weapon is allowed to be introduced through an opening of the locking member into a holding position of the locking member, and such that, when the weapon is positioned in said holding position, the spring loaded locking member is returned to said closed position by means of a spring force, the arrangement further comprises a guiding arrangement comprising a guide member and an arc shaped groove, wherein the guide member is configured to run along said arc shaped groove for controlling the movement of the locking member in the restricted rotational movement.

2. The arrangement according to claim 1, further comprising an actuator arranged for moving the locking member against a spring force into said open position for allowing said weapon to be released.

3. The arrangement according to claim 2, wherein said actuator is arranged onto said locking member.

4. The arrangement according to claim 1, further comprising a spring member connected between said fixed support member and said locking member so as to provide said spring load of the arrangement.

5. The arrangement according to claim 1, wherein the locking member is movably connected to the support member such that the movement of the locking member relative to the support member is a restricted rotational movement about a rotational centre.

6. The arrangement according to claim 5, wherein the locking member is configured such that when the weapon is in the holding position, the centre of the weapon is offset relative to the rotational centre of the locking member.

7. The arrangement according to claim 1, wherein said arc shaped groove is arranged in said support member and wherein the guide member is attached to said locking member.

8. The arrangement according to claim 1, wherein the locking member has a horseshoe shaped portion providing said opening.

9. The arrangement according to claim 8, wherein the opening comprises an angled portion so as to allow the locking member to receive weapons of different sizes.

10. The arrangement according to claim 1, wherein said support member has a cover portion configured to cover the opening of the locking member in the closed position.

11. The arrangement according to claim 10, wherein said support member has a claw shaped end portion having a first arm portion constituting said cover portion and second arm portion, said arm portions providing an opening there between for allowing the weapon in the open position of the locking member in which the opening of the locking member is configured to essentially coincide with the opening of the support member.

12. The arrangement according to claim 10, wherein the cover portion has an angled shape so as to allow the arrangement to receive weapons of different sizes.

13. The arrangement according to of claim 1, wherein said weapon has a barrel to be received by said arrangement.

14. A vehicle comprising an arrangement according to claim 1.

* * * * *